UNITED STATES PATENT OFFICE.

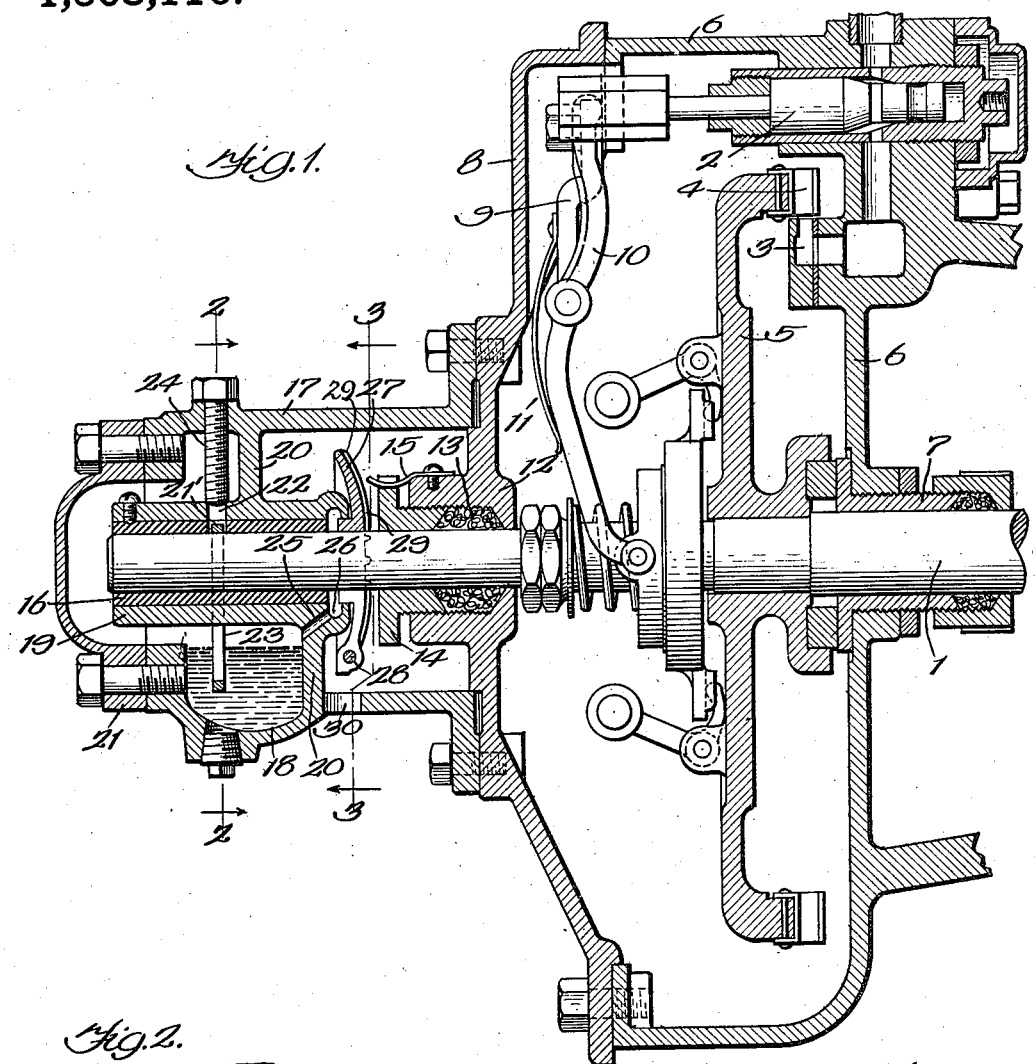
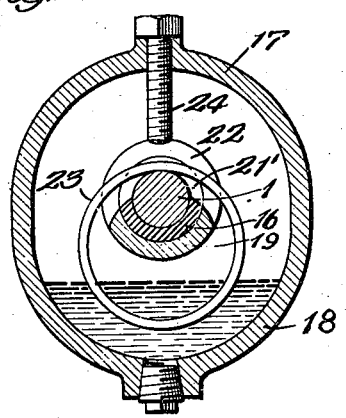
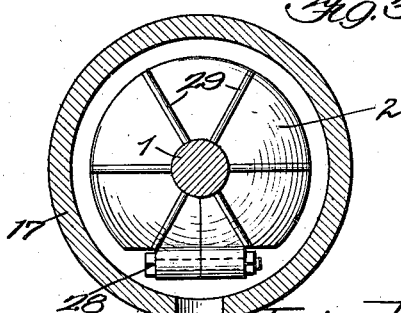

MARK A. ROSS, OF CHICAGO, ILLINOIS.

STEAM-TURBINE.

1,308,116.  Specification of Letters Patent.  Patented July 1, 1919.

Application filed August 15, 1918. Serial No. 250,004.

*To all whom it may concern:*

Be it known that I, MARK A. Ross, citizen of the United States, residing at Chicago, in the county of Cook and State of Illinois, have invented a certain new and useful Improvement in Steam-Turbines, of which the following is a full, clear, concise, and exact description.

My invention relates to lubricating structures and, in one of its characteristics, particularly to such a structure embodied in a steam turbine, another feature of the invention not being limited to such use.

The invention has for one of its objects the provision of means for preventing water of condensation in a turbine from accumulating in the container employed for holding oil or other liquid lubricant that is automatically supplied to the turbine shaft. Hitherto this water of condensation has accumulated to such an extent as to empty the container of the lubricant with the result that parts would be worn and would get out of alinement and disarrange the normal interrelation of various turbine parts.

The invention has for another of its objects the improved assembly of a loose lubricant distributing ring with a lubricant container and a bearing to be supplied with lubricant from said container by said ring.

I will explain my invention more fully by reference to the accompanying drawing showing the preferred embodiment thereof and in which Figure 1 is a view in longitudinal section showing a portion of a steam turbine embracing both characteristics of my invention; Fig. 2 is a sectional view on line 2—2 of Fig. 1 and Fig. 3 is a sectional view on line 3—3 of Fig. 1.

Like parts are indicated by similar characters of reference throughout the different figures.

The turbine illustrated is one that is employed for driving an electric current generator that supplies a locomotive electric head light with current, the generator armature being upon the turbine shaft 1. This shaft is propelled by means of steam passing through the governor valve 2 and the steam nozzle 3 to the blades 4 carried upon the periphery of the turbine wheel 5 which is rigidly secured to the shaft. A housing incloses the nozzle, wheel, and other parts of the turbine structure. This housing is desirably made in two parts, the portion 6 carrying the governor valve and the steam nozzle and being in steam tight assembly with the shaft by means of the stuffing box 7. The other housing portion 8 carries the governor bracket 9 which supports the valve controlling governor bell crank 10 and the governor spring 11, in accordance with common practice. This housing portion 8 is integrally formed with a receptacle or stuffing box 12 having a threaded bore coaxial with and surrounding the shaft and which contains packing 13. The inner end wall of this receptacle is in close engagement with the shaft to limit the passage of exhaust steam to the packing 13 whose purpose is to prevent the further passage of steam. A packing nut 14 enters the bore of the packing receptacle 12 and may be inwardly adjusted from time to time to stop the packing from leaking. A spring 15 holds the nut in its adjustment. The shaft 1 projects through the stuffing box 12, being supported at its outer end within a bearing 16 carried by the substantially closed cap 17 bolted to the exterior of the housing portion 8. The packing 13 prevents the exhaust steam and the water or condensation therefrom from reaching the bearing 16 and the surrounding oil or lubricant container from which lubricant is supplied to the bearing, whereby the lubricant may be retained in the bearing and the lubricant container without danger of having this lubricant expelled by the water of condensation. The cap 17 carries a cylindrical sleeve 19 whose bore is coaxial with the shaft and contains the bearing 16 with which it is in fluid tight engagement. The webbing 20 is an integral portion of the cap 17 and is integrally formed with and supports the sleeve 19. The cap extends beyond the webbing to form the lubricant container or chamber 18 which surrounds the bearing and has a pocket beneath the bearing to constitute a form of lubricant reservoir. This container may be closed at the outer end of the shaft by a detachable cover 21. The bearing 16 and its supporting sleeve 19 are provided in their top portions with communicating slots 21', 22 in which a lubricant feeding ring 23 is loosely disposed. This ring bears at its top portion upon the shaft 1 which causes the ring to creep, and as the ring creeps it transfers lubricant into which it dips from the container to the shaft. A guard 24 overlies the slot 21'—22 to prevent the ring from leaving said slot. This guard is preferably in the form of a bolt passing through the cap and having its inner end in guarding position. In assembling the parts the ring is slipped over the bearing 16 and its supporting sleeve 19, there being sufficient clearance between the sleeve and the lubricant container for this purpose. The bolt 24 being then sufficiently withdrawn, the ring is placed in the slot 21'—22 whereafter the bolt is adjusted to guarding position. All of these parts may be assembled and adjusted while the shaft is removed, the shaft being readily insertible thereafter in its bearing.

The web 20 is imperforate except for a lubricant return passage 25 leading from the inner end of the bearing 16 back to the container 18. The sleeve 19 has an annular groove 26 at its inner end and in communication with the return passage 25, this groove catching the lubricant passing from the inner end of the bearing and directing it to said passage from whence it flows back to the container. The lubricant passing from the outer end of the bearing passes directly back to the lubricant container. By this arrangement the lubricant may be used over and over again. The inner end of the sleeve 19 is sealed or brought into fluid tight relation with the shaft preferably by means of a radially split baffle plate or disk 27 whose hub or central portion is snugly surrounded by the sleeve. A clamping bolt 28 clamps the baffle upon the shaft to bring the baffle into fluid tight assembly with the shaft. The baffle coöperates with the sleeve 19 and the webbing 20 to prevent the passage of fluid from either side of the webbing to the other. This construction not only prevents the wasteful passage of lubricant from the container 18 into the inner chamber of the cap 17 but also prevents any exhaust steam and water of condensation that escapes through the packing 13 from entering the outer chamber 18 (the lubricant container). The baffle 26 thus acts as a supplemental guard to prevent water of condensation from entering the lubricant container and displacing the lubricant therein, this feature being of importance in case the packing nut 14 is not maintained in proper adjustment to prevent leakage through the packing 13. The baffle may have ribs or vanes 29 further to direct water away from the container 18. Any water of condensation that occurs in the inner chamber of the cap 17 finds exit through the opening 30.

While I have herein shown and particularly described the preferred embodiment of my invention, I do not wish to be limited to the precise details of construction shown as changes may readily be made without departing from the spirit of my invention, but having thus described my invention I claim as new and desire to secure by Letters Patent the following:—

1. The combination with a substantially closed lubricant container; of a sleeve therein; a bearing in said sleeve; a loose lubricant feeding ring upon the shaft and dipping into the lubricant in the container, there being a slot formed in the upper portions of said sleeve and bearing in which the ring is disposed to enable it to engage the shaft, there also being clearance between the container and sleeve to permit the ring to be moved along the sleeve in the process of assembly; and a guard positioned to engage the ring and prevent it from leaving said slot.

2. The combination with a substantially closed lubricant container; of a sleeve therein; a bearing in said sleeve; a loose lubricant feeding ring upon the shaft and dipping into the lubricant in the container; there being a slot formed in the upper portions of said sleeve and bearing in which the ring is disposed to enable it to engage the shaft, there also being clearance between the container and sleeve to permit the ring to be moved along the sleeve in the process of assembly; and a guarding bolt adjustably carried by the container above said slot to maintain the ring in place.

In witness whereof, I hereunto subscribe my name this 12th day of August, A. D. 1918.

MARK A. ROSS.